US011444989B1

United States Patent
Han et al.

(10) Patent No.: US 11,444,989 B1
(45) Date of Patent: Sep. 13, 2022

(54) SELF-SELECT SUB-MEETINGS IN VIDEOCONFERENCING

(71) Applicant: Zoom Video Communications, Inc., San Jose, CA (US)

(72) Inventors: Lin Han, Los Altos, CA (US); Nitasha Walia, Sunnyvale, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 17/237,639

(22) Filed: Apr. 22, 2021

(51) Int. Cl.
*H04L 65/401* (2022.01)
*H04L 12/18* (2006.01)
*H04N 7/15* (2006.01)

(52) U.S. Cl.
CPC ...... *H04L 65/4015* (2013.01); *H04L 12/1818* (2013.01); *H04L 12/1822* (2013.01); *H04N 7/15* (2013.01)

(58) Field of Classification Search
CPC ............. H04L 65/4015; H04L 12/1818; H04L 12/1822; H04N 7/15
See application file for complete search history.

(56) References Cited

U.S. PATENT DOCUMENTS

| | | | | |
|---|---|---|---|---|
| 7,653,013 | B1 * | 1/2010 | Moran | H04L 12/1822 370/260 |
| 9,961,119 | B2 | 5/2018 | Bader-natal et al. | |
| 11,132,110 | B1 * | 9/2021 | Christensen | H04N 7/15 |
| 2007/0300165 | A1 * | 12/2007 | Haveliwala | G06F 3/0482 715/810 |
| 2011/0149809 | A1 * | 6/2011 | Narayanaswamy | H04N 7/15 379/202.01 |
| 2012/0110475 | A1 * | 5/2012 | Han | H04L 12/1818 715/753 |
| 2014/0267550 | A1 | 9/2014 | Nimri et al. | |
| 2020/0219216 | A1 * | 7/2020 | Davis | H04N 21/44 |
| 2020/0280456 | A1 * | 9/2020 | Kubo | H04L 12/1831 |

OTHER PUBLICATIONS

MS Teams: "How to Assign or Self Select Groups for Breakout Room Activities"—mmutube; Aug. 14, 2020, Leanne Fitton, 12 pages (available at https://mmutube.mmu.ac.uk/media/MS+Teams A+How+to+assign+or+self+select+groups+for+breakout+room+ac tivities/1_10n9q9zd).

* cited by examiner

*Primary Examiner* — Chris Parry
*Assistant Examiner* — Abderrahmen Chouat
(74) *Attorney, Agent, or Firm* — Kilpatrick Townsend & Stockton LLP

(57) ABSTRACT

One disclosed example method includes a video conference provider establishing a main meeting of a video conference and multiple associated sub-meetings at the request of a host client device associated with a host of the meeting. The method further includes the video conference provider determining that a self-selection mode for the sub-meetings is enabled and transmitting notifications to participant client devices associated with the participants of the meeting. Each notification identifies a list of sub-meetings from which a participant can select a sub-meeting to join. The method further includes the video conference provider receiving and forwarding a request from a participant client device to connect to a selected sub-meeting, and receiving an automatic approval from the host client device. The video conference provider further connects the participant client device to the selected sub-meeting.

19 Claims, 8 Drawing Sheets

SELF-SELECT SUB-MEETINGS IN VIDEOCONFERENCING

FIELD

The present application generally relates to videoconferences and more particularly relates to systems and methods for enabling participants of a main videoconferencing meeting to self-select sub-meetings to join.

BACKGROUND

Videoconferencing has become a common way for people to meet as a group, but without being at the same physical location. Participants can be invited to a videoconference meeting, join from their personal computers or telephones, and are able to see and hear each other and converse largely as they would during an in-person group meeting or event. The advent of user-friendly videoconferencing software has enabled teams to work collaboratively despite being dispersed around the country or the world. It has also enabled families and friends to engage with each other in more meaningful ways, despite being physically distant from each other.

SUMMARY

Various examples are described for systems and methods for enabling participants of a main videoconferencing meeting to self-select sub-meetings to join. One example method includes establishing, responsive to a first instruction from a host client device to start a main meeting of a video conference, the main meeting by connecting the host client device to the main meeting and processing multimedia streams to and from the host client device for the main meeting; joining a plurality of participants to the main meeting in response to requests from each of the participants to join the video conference; receiving, from the host client device, a second instruction to start a plurality of sub-meetings for the main meeting; establishing the plurality of sub-meetings; and in response to determining that a self-selection mode for the plurality of sub-meetings is enabled, transmitting one or more notifications to participant client devices associated with the plurality of participants, the one or more notifications identifying one or more lists of sub-meetings available to the participant client devices; receiving, from a participant client device, a request to connect to a particular sub-meeting of the plurality of sub-meetings; forwarding the request to the host client device and receiving approval of the request from the host client device; and responsive to receiving the approval of the request from the host client device, connecting the participant client device to the particular sub-meeting and processing multimedia streams to and from the participant client device for the particular sub-meeting.

One example non-transitory computer-readable media is communicatively coupled to one or more processors and storing processor-executable instructions that, when executed by the one or more processors, cause the one or more processors to perform operations comprising: establishing, responsive to a first instruction from a host client device to start a main meeting of a video conference, the main meeting by connecting the host client device to the main meeting and processing multimedia streams to and from the host client device for the main meeting; joining a plurality of participants to the main meeting in response to requests from each of the participants to join the video conference; receiving, from the host client device, a second instruction to start a plurality of sub-meetings for the main meeting; establishing the plurality of sub-meetings; in response to determining that a self-selection mode for the plurality of sub-meetings is enabled, transmitting one or more notifications to participant client devices associated with the plurality of participants, the one or more notifications identifying a list of sub-meetings available to the participant client devices; receiving, from a participant client device, a request to connect to a particular sub-meeting of the plurality of sub-meetings; and connecting the participant client device to the particular sub-meeting and processing multimedia streams to and from the participant client device for the particular sub-meeting.

One example system includes a processor; and a memory device including instructions that are executable by the processor to cause the processor to perform operations comprising: initiating a main meeting of a video conference by requesting the main meeting to be started and by generating and sending multimedia streams for the main meeting; initiating a plurality of sub-meetings associated with the main meeting, the main meeting comprising a plurality of participants; entering a self-selection mode to allow each of the plurality of participants to choose a sub-meeting from the plurality of sub-meetings to join; while operating in the self-selection mode, causing notifications to be sent to participant client devices associated with the respective participants, the notifications identifying one or more lists of sub-meetings available to the respective participant client devices; receiving a request to join a particular sub-meeting of the plurality of sub-meetings by a participant of the plurality of participants; and responsive to receiving the request to join the particular sub-meeting, sending approval for the participant to join the particular sub-meeting.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The accompanying drawings, which are incorporated into and constitute a part of this specification, illustrate one or more certain examples and, together with the description of the example, serve to explain the principles and implementations of certain examples.

DETAILED DESCRIPTION

Figure 1:
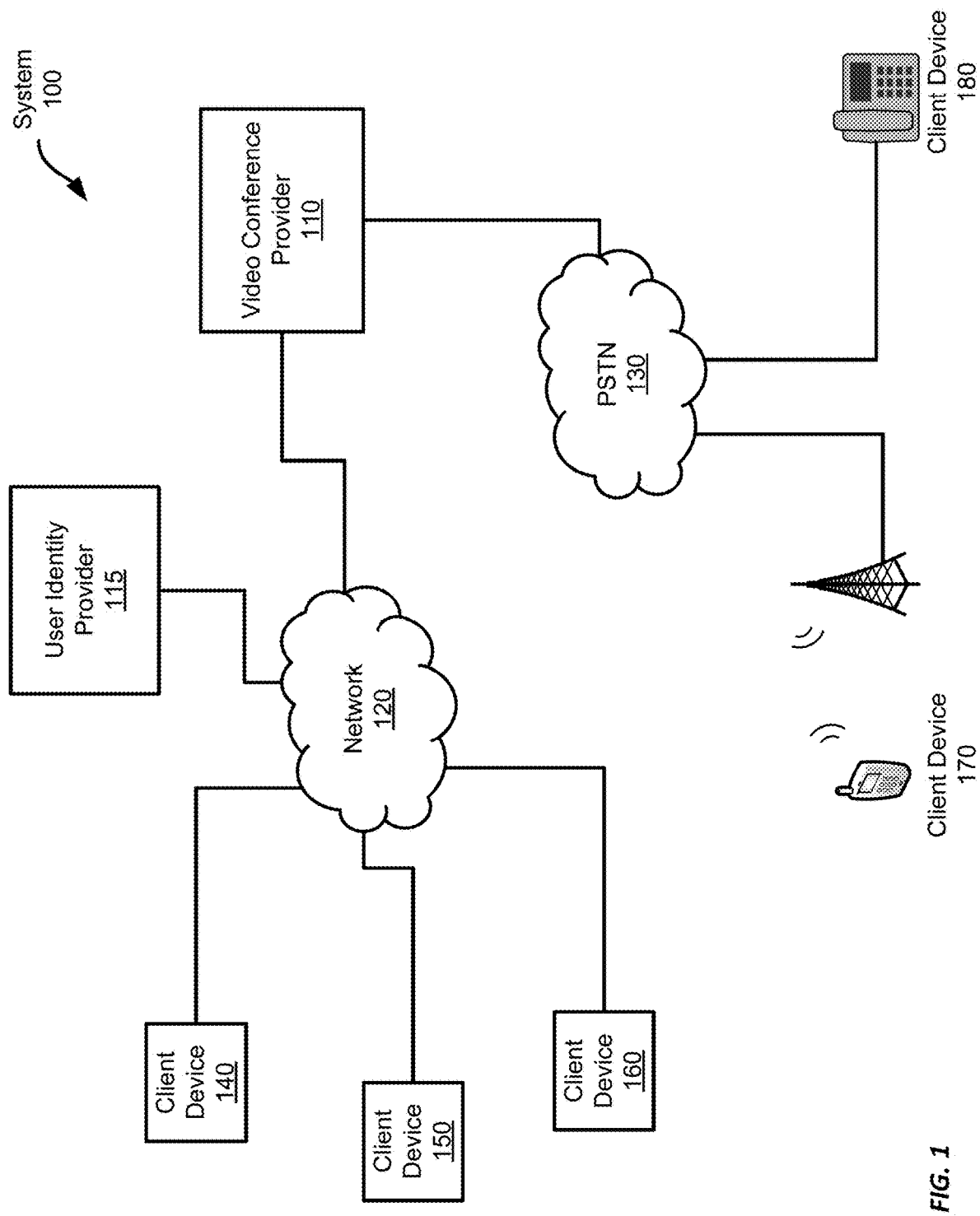
FIG. 1 shows an example system that provides videoconferencing functionality to various client devices, according to certain aspects described herein.

Examples are described herein in the context of systems and methods for enabling participants of a main videoconferencing meeting to self-select sub-meetings to join. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Videoconferencing systems enable their users to create and attend videoconferences (or "meetings") via various types of client devices. After joining a meeting, the participants receive audio and video streams or feeds (or "multimedia" streams or feeds) from the other participants and are presented with views of the video feeds from one or more of the other participants and audio from the audio feeds. Using these different modalities, the participants can see and hear each other, engage more deeply, and generally have a richer experience despite not being physically in the same space.

To create a meeting, a person (referred to as the "host" or "meeting host") accesses the videoconferencing system, creates a new meeting, and identifies one or more other people to invite to the meeting. In response to the host creating the meeting, the videoconference system establishes the meeting by creating a meeting identifier and, if desired, a passcode or other access control information. The host can then send the meeting identifier (and access control information) to each of the invitees, such as by email. Once the meeting is started, the invitees can then access and join the meeting using the meeting identifier and any provided access control information.

The host controls and manages various functions of the meeting, such as managing sub-meetings, sometimes referred to as "breakout rooms," associated with the "main" videoconference meeting. Participants in the main videoconference meeting may exit the meeting into a sub-meeting, e.g., to discuss a particular topic, before returning to the main meeting. The host can create multiple sub-meetings (e.g., one sub-meeting for one particular topic) and assign participants to different sub-meetings. However, for a meeting with a large number of participants (e.g., a meeting for a large class of students or a large conference), assigning each participant to a sub-meeting can be exhausting and inefficient. In addition, in some cases, such as large conferences, the participants may want to join different sessions (sub-meetings) based on their interests. This information is generally not available to the host when assigning participants to sub-meetings.

To provide more flexibility and convenience in assigning participants to sub-meetings (breakout rooms) for a videoconferencing meeting, a videoconferencing system according to this disclosure allows a participant to self-select the sub-meeting that he/she wants to join. In one example, a client device associated with a host (referred to as the "host client device") initiates a main videoconferencing meeting (also referred to herein as the "main meeting") by communicating with a video conference provider. The video conference provider creates the main meeting which can include multiple participants. Each participant joins the main meeting by connecting the client device associated with the participant (referred to as the "participant client device") to the main meeting (e.g., through connecting to a server configured to handle multimedia streams for the main meeting).

In addition to the main meeting, the host client device further initiates multiple sub-meetings (breakout rooms) associated with the main meeting for the participants to join (e.g., for discussions on separate topics). The host client device enables a self-selection mode configured to allow the participants to choose the sub-meetings that they want to join. In the self-selection mode, the host client device instructs the video conference provider to send a notification to each participant regarding the created sub-meetings and a list of sub-meetings that they can join. In some implementations, the list of sub-meetings sent to a participant may be different from the list sent to another participant.

Upon receiving the notification, a participant can select a sub-meeting from the list and use the participant client device to send a request to join the selected sub-meeting. The video conference provider receives the request and forwards it to the host client device, where the request is automatically approved. The video conference provider further disconnects the participant client device from the main meeting and connects it to the requested sub-meeting.

In some examples, when initiating the sub-meetings, the host assigns the participants to different sub-meetings. The assignment can be generated automatically, based on the input of the host, or according to a pre-determined assignment list. In these examples, the video conference provider automatically connects the participant client devices to the corresponding sub-meetings based on the assignment after creating the sub-meetings. While in the respective sub-meetings, the participant client devices can request to switch to a second sub-meeting by submitting a request to join the second sub-meeting. The video conference provider receives and forwards the request to the host client device which automatically approves the request. Upon obtaining the approval, the video conference provider disconnects the participant client device from the first sub-meeting and connects it to the second sub-meeting.

If, while operating in the self-selection mode, the host client device determines that a participant client device does not support the self-selection mode (e.g., the client device is a telephone or a computer with a lower version of the videoconferencing software application), the host can assign the participant client device to a sub-meeting instead of letting the participant select the sub-meeting to join.

The host client device may be further configured to exit the self-selection mode after determining that each participant has joined a sub-meeting or elected to stay in the main meeting. After the host client device exits the self-selection mode, participants of the meeting can no longer choose the sub-meetings that they want to join. In other words, rather than switching to a different sub-meeting, a participant needs to remain in the current sub-meeting where he/she is in or return to the main meeting.

The techniques disclosed herein for enabling participants of a main videoconferencing meeting to self-select sub-meetings to join improve the efficiency of the videoconferencing process. With the self-selection function, the host does not need to generate assignments of participants to sub-meetings either before or after the main videoconferencing meeting starts. This allows the meeting to proceed faster and more efficiently. In addition, the techniques disclosed herein also provide convenience to uses, since participants can choose the sub-meeting that they want to join instead of being assigned by the host.

This illustrative example is given to introduce the reader to the general subject matter discussed herein and the disclosure is not limited to this example. The following sections describe various additional non-limiting examples and examples of systems and methods for securely recording and retrieving encrypted video conferences.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the video conference provider 110 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
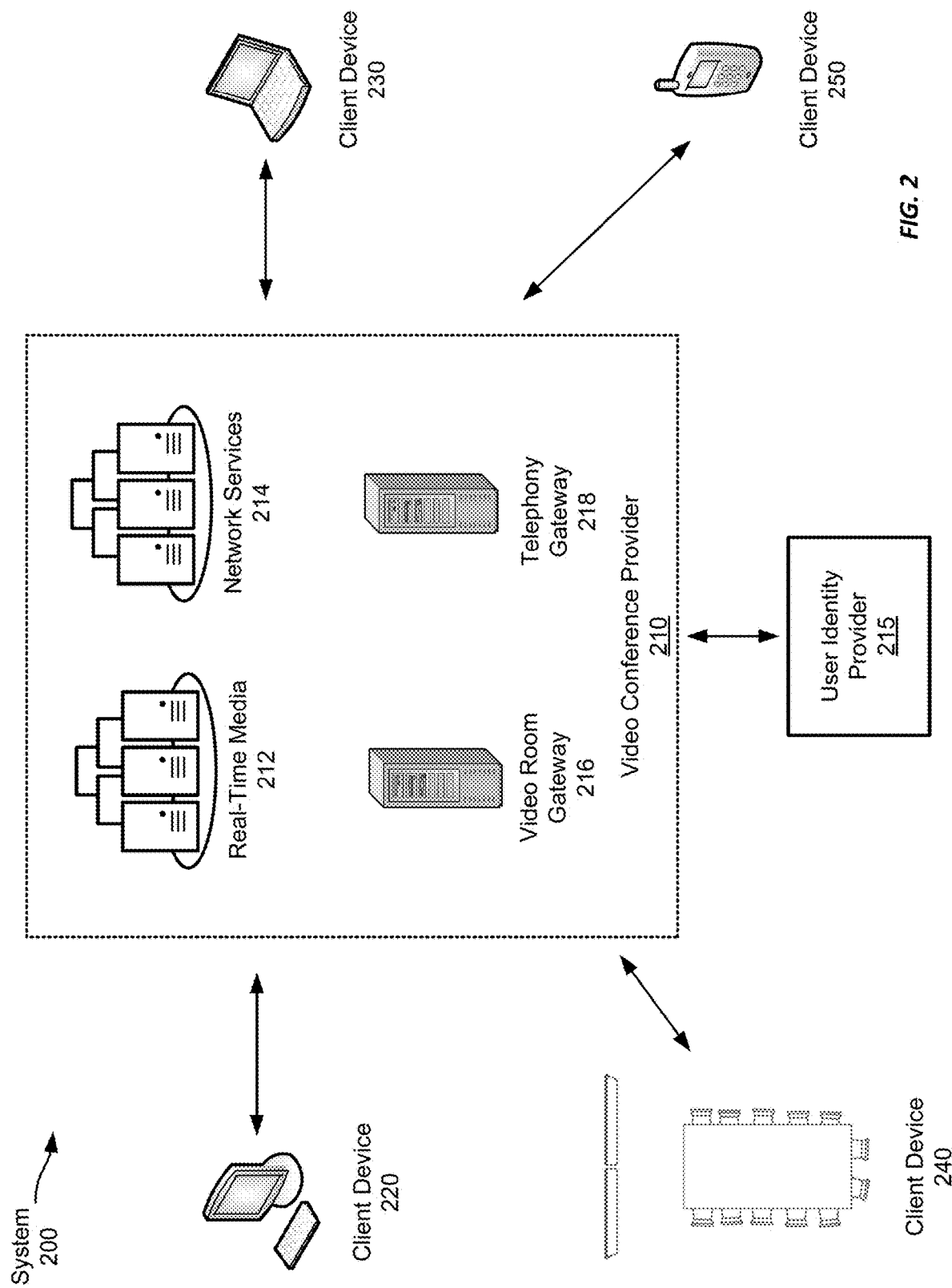
FIG. 2 shows an example system in which a video conference provider provides videoconferencing functionality to various client devices, according to certain aspects described herein.

Video conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the video conference provider 110.

Meetings in this example video conference provider 110 are provided in virtual "rooms" to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, and as alluded to above, a meeting may also have "breakout" rooms. Such breakout rooms may also be rooms that are associated with a "main" videoconference room. Thus, participants in the main videoconference room may exit the room into a breakout room, e.g., to discuss a particular topic, before returning to the main room. The breakout rooms in this example are discrete meetings that are associated with the meeting in the main room. However, to join a breakout room, a participant must first enter the main room. A room may have any number of associated breakout rooms according to various examples.

To create a meeting with the video conference provider 110, a user may contact the video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating the that meeting has not yet started or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that has audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices. etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different aspects of video conference functionality, thereby enabling the various client devices to create and participate in video conference meetings. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory, and network I/O as well as network parameters such as packet loss, latency, and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia streams in some examples. As discussed above, multimedia streams may be encrypted between the client devices 220-250 and the video conference provider 210. In some such examples, the real-time media servers 212 may decrypt incoming multimedia streams, multiplex the multimedia streams appropriately for the various clients, and encrypt the multiplexed streams for transmission.

In some examples, to provide multiplexed streams, the video conference provider 210 may receive multimedia streams from the various participants and publish those streams to the various participants to subscribe to and receive. Thus, the video conference provider 210 notifies a client device, e.g., client device 220, about various multimedia streams available from the other client devices 230-250, and the client device 220 can select which multimedia stream(s) to subscribe to and receive. In some examples, the video conference provider 210 may provide to each client device the available streams from the other client devices, but from the respective client device itself, though in other examples it may provide all available streams to all available client devices. Using such a multiplexing technique, the video conference provider 210 may enable multiple different streams of varying quality, thereby allowing client devices to change streams in real-time as needed, e.g., based on network bandwidth, latency, etc.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider 210, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials.

Once the user's credentials have been accepted, the client device may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples, additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider.

The video room gateway servers 216 provide specialized authentication and communication with the dedicated video conferencing hardware that may not be available to other client devices 220-230, 250. For example, the video conferencing hardware may register with the video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information, etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosted by the video conference provider. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
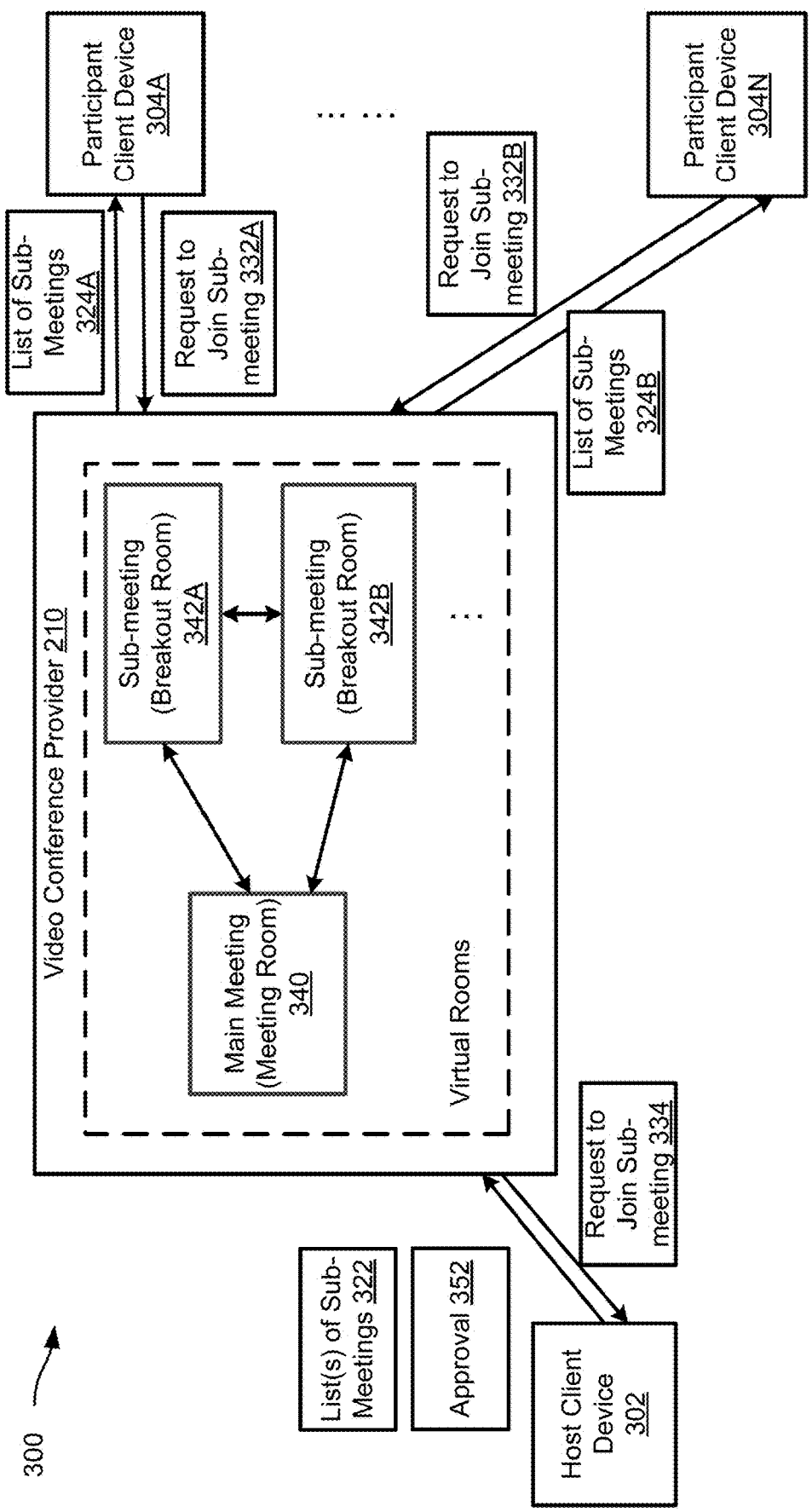
FIG. 3 shows an example of an operating environment for enabling participants of a main videoconferencing meeting to self-select sub-meetings to join, according to certain aspects described herein.

Referring now to FIG. 3, FIG. 3 shows an example of an operating environment 300 for enabling participants of a main videoconferencing meeting to self-select sub-meetings to join, according to certain aspects described herein. The operating environment 300 includes the video conference provider 210 as described above with respect to FIGS. 1 and 2, a host client device 302 associated with the host of the main meeting, and participant client devices 304A-304N associated with participants of the meeting. The participant client devices 304A-304N may be referred to herein individually as a participant client device 304 or collectively as the participant client devices 304. The host client device 302 and the participant client devices 304 may be any type of client device, such as those discussed above with respect to FIGS. 1 and 2 or below with respect to FIG. 6.

As discussed above with respect to FIGS. 1 and 2, the video conference provider 210 is configured to provide video conference functionalities for the host client device 302 and the participant client devices 304. To initiate a meeting, the host client device 302 can send a request to the video conference provider 210. Responsive to the request, the video conference provider 210 can establish the meeting, that is, the main meeting 340. The main meeting 340 can be presented to users (including the host and participants) as a virtual meeting room with visual representations of some or all of the participants provided either by their respective video feed or an identifier, such as their name.

In addition, the host client device 302 can further request the video conference provider 210 to establish multiple sub-meetings, such as sub-meetings 342A, 342B, and so on (which may be referred to herein individually as a sub-meeting 342 or collectively as the sub-meetings 342). Sub-meetings 342 can be presented to users as virtual breakout rooms similar to how the main videoconferencing meeting is presented. Each virtual room includes participants, the identities of which can be accessed and presented as a list in a user interface displayed by client devices with appropriate display capabilities. A client device (the host client device 302 or a participant client device 304) joining or connecting to a virtual room (the main meeting 340 or a sub-meeting 342) can be implemented as the client device connecting to a corresponding real-time media server identified by the video conference provider 210 as discussed above with respect to FIG. 2.

When requesting the video conference provider 210 to establish the sub-meetings 342, the host client device 302 may send a list of the sub-meetings 342 to be created and specify that a self-selection mode is enabled. In some examples, the video conference provider 210, after determining that the host has enabled the self-selection mode for the sub-meetings 342, sends a notification to each of the participants of the main meeting 340 that sub-meetings are available to join. The notification further specifies the sub-meetings 342 from which the participant can choose to join. In some examples, the video conference provider 210 sends the same list of sub-meetings 342 to each of the participants. In other examples, the list sent to one participant may be different from the list sent to another participant.

For example, the host may determine that some sub-meetings are limited to certain participants and thus other participants cannot join (e.g., sub-meetings on advanced topics are limited to students above a certain level, or sub-meetings on certain confidential topics may be limited to participants having a particular job title or security authorization). To specify the different sub-meetings that different participants may join, the host client device 302 can be configured to send multiple lists 322 of sub-meetings and the associated participants to the video conference provider 210. For instance, the host can divide the participants of the main meeting 340 into three different groups. Participants in different groups can receive different lists of sub-meetings. The host client device 302 can send three lists to the video conference provider 210: a first list includes all the sub-meetings open to a first group of participants; a second list includes a subset of the sub-meetings open to a second group of participants; a third list includes a different subset of the sub-meetings open to the third group of participants. The video conference provider 210 in turn sends different lists of sub-meetings to participants in different groups.

The list of sub-meetings may be presented in a user interface on a participant client device which is connected to the main meeting when receiving the notification. From the list, the participant using the participant client device 304 can select a sub-meeting to join. Based on the selection, the participant client device 304 sends a request to join sub-meeting 332 to the video conference provider 210. The video conference provider 210 receives and forwards the request to the host client device 302 which automatically approves the request and returns an approval 352. Note that in this example, the host client device 302 can be configured to automatically approve the request because the filtering of participants of the sub-meetings 332 is performed when the host device 302 sends different lists 322 of sub-meetings for different participants as discussed above. Based on the approval 352, the video conference provider 210 admits the requesting participant client device 304 to the selected sub-meeting 342 (e.g., by connecting the participant client device 304 to the real-time media server configured for handling the sub-meeting 342). If a participant does not choose a sub-meeting to join, the participant will stay in the main meeting 340. The host can assign the participants in the main meeting 340 to any of the sub-meetings 342 at any point before the sub-meetings are closed.

While in a sub-meeting, the participant may choose to return to the main meeting 340. From the main meeting 340, the participant can select the sub-meeting to join as described above. Alternatively, or additionally, the participant can switch to another sub-meeting 342 from the current sub-meeting by making the selection from the list of sub-meetings. Similar to the selection described above, the participant client device 304 sends a request to join the selected sub-meeting to the video conference provider 210 which in turn sends the request to the host client device 302. The video conference provider 210 admits the participant client device 304 to the newly selected sub-meetings 342 upon receiving the automatic approval from the host client device 302.

In some scenarios, the host client device 302 may further send a sub-meeting assignment to the video conference provider 210. The assignment may be sent to the video conference provider 210 before the sub-meetings 342 start, along with the request to establish and start the sub-meetings 342, or after the sub-meetings 342 start. For example, the host can pre-assign participants to sub-meetings 342 before the sub-meetings 342 are started. The video conference provider 210 stores such an assignment and applies it when starting the sub-meetings 342. As a result, the participants are placed in the assigned sub-meetings 342 when the sub-meetings 342 are established. While in the assigned sub-meeting 342, a participant can select to join another sub-meeting 342 or return to the main meeting 340 as described above.

Likewise, in scenarios where the assignment is sent to the video conference provider 210 along with the request to start the sub-meetings 342, the video conference provider 210 applies the assignment when starting the sub-meetings 342 thereby placing the participants in the respective assigned sub-meetings 342. The participant can then select to join another sub-meeting 342 or return to the main meeting 340 as described above. In these examples, the assignment may be generated automatically (e.g., randomly or by applying an assignment algorithm) or based on inputs by the host.

It should be understood that while in the above examples, the video conference provider 210 is configured to, before admitting a participant client device 304 to a sub-meeting, forward the request to join a sub-meeting to the host client device 302 and receive the approval from the host client device 302, these steps can be omitted. For example, the video conference provider 210 can determine that the host has enabled the self-selection mode. In such a mode, the video conference provider 210 can automatically admit a participant client device 304 to a selected sub-meeting 342 upon receiving the request to join the sub-meeting 342. In this way, the response time to the request to join a sub-meeting 332 can be reduced and the consumption of network bandwidth can also be reduced. In this example, if the host disables the self-selection mode, the host client device 302 sends a notification to the video conference provider 210 so that the video conference provider 210 stops the automatic admission of the participant client devices 304 to the sub-meetings 342.

Figure 4A:
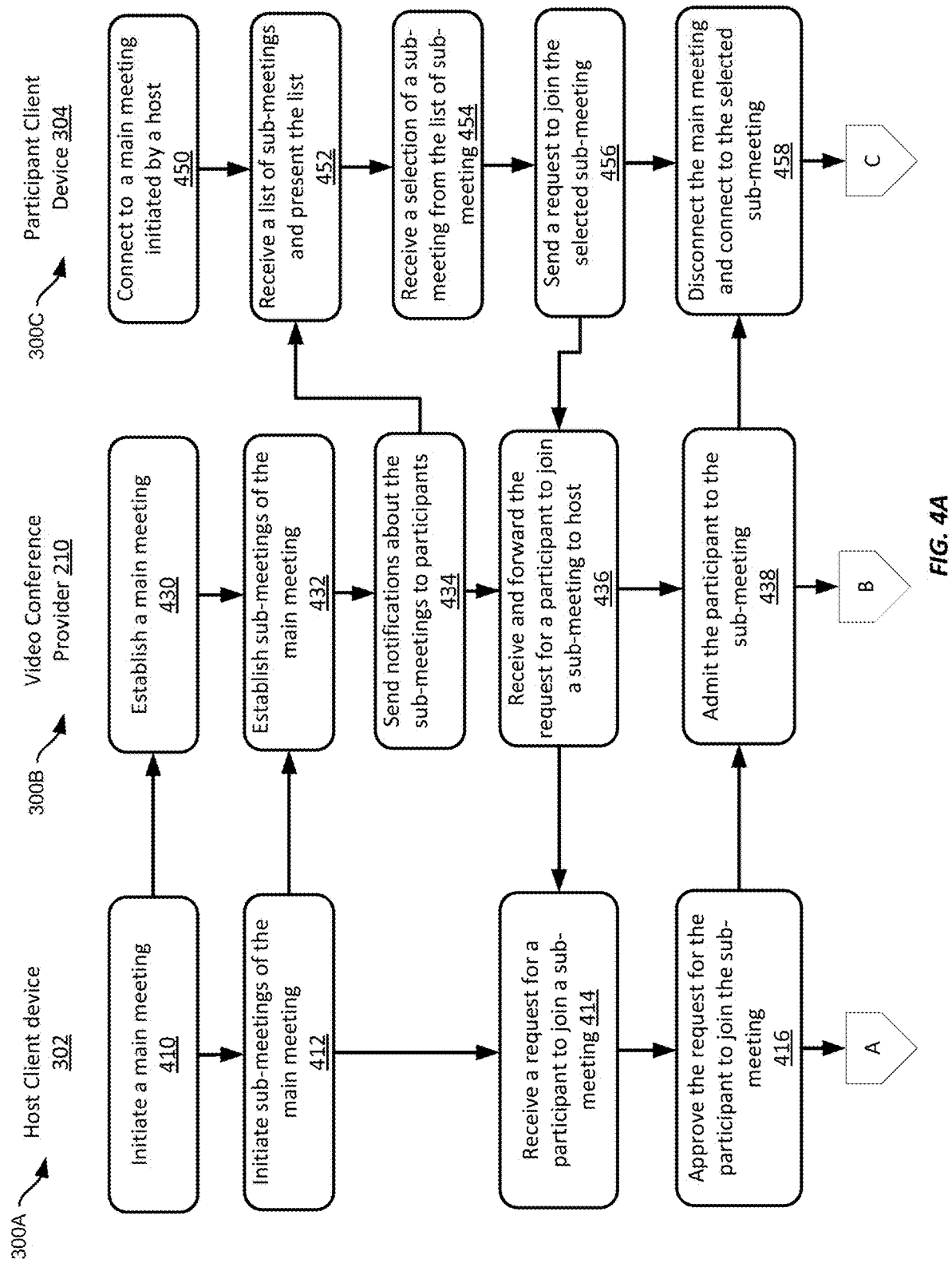
FIGS. 4A and 4B shows examples of several processes for various devices operating in self-selection mode for sub-meetings of a main meeting, according to certain aspects described herein.
Figure 4B:
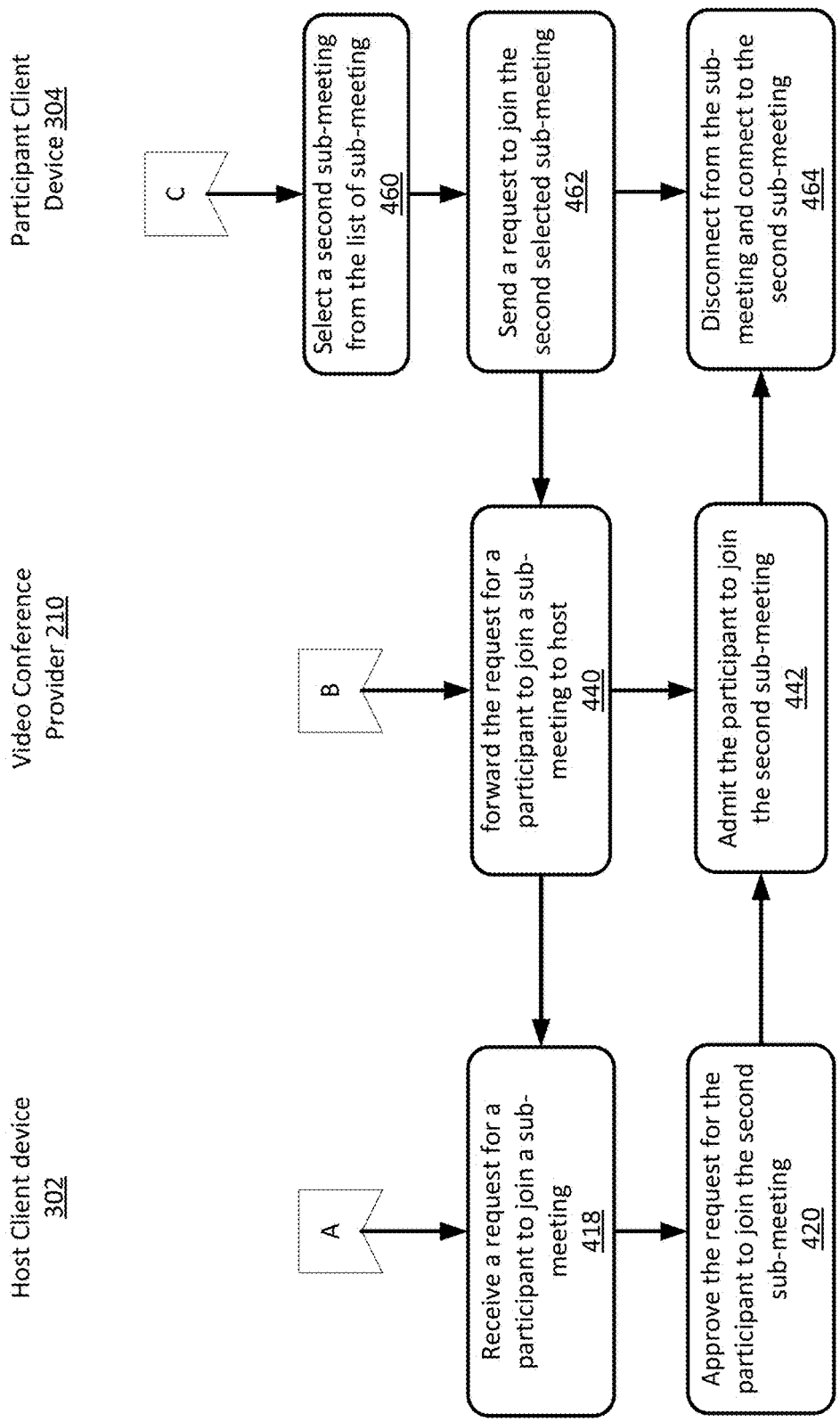

Referring now to FIGS. 4A and 4B, FIGS. 4A and 4B include several flow diagrams that illustrate several processes 400A, 400B, and 400C for enabling participants of a main videoconferencing meeting to self-select sub-meetings to join, according to some aspects described herein. FIGS. 4A and 4B will be described with respect to the systems shown in FIG. 3; however any suitable system according to this disclosure may be employed, including any of the systems shown in FIGS. 1 and 2. In particular, the process 400A illustrates aspects of the host client 302; the process 400B illustrates aspects of the video conference provider 210; and the process 400C illustrates aspects of a participant client device 304. The processes 400A, 400B, and 400C are described together below.

At block 410, the host client device 302 initiates a main meeting 340, for example, by sending a request for the main meeting to the video conference provider 210. The main meeting 340 may be initiated in various ways. For example, the main meeting 340 may be initiated by the host activating a user interface control in a user interface presented on the host client device 302 (e.g., a button configured to start the meeting). The main meeting 340 may also be initiated in response to determining that the scheduled time for the main meeting 340 has arrived. At block 430, the video conference provider 210 establishes the main meeting 340 upon receiving the request as described above with respect to FIGS. 1-3, such as by connecting the host client device to the main meeting and processing multimedia streams to and from the host client device for the main meeting. Once the main meeting 340 is established, the host client device 302 is configured to generate and send multimedia streams for the main meeting and participants can join the main meeting 340 by connecting the participant client devices 304 to the main meeting 340, at block 450.

At block 412, the host client device 302 initiates sub-meetings 342 for the main meeting 340. Similar to the main meeting, the host client device 302 may initiate the sub-meetings 342 by sending a request to the video conference provider 210 for starting the sub-meetings 342. The request may be sent in response to the host activating a user interface control configured for starting the sub-meetings 342 or in response to conditions for starting the sub-meetings 342 have met, such as the scheduled time to start has arrived. At block 432, the video conference provider 210 establishes or starts these sub-meetings 342 in response to the request. In some scenarios, the sub-meetings 342 may have been pre-set by the host and communicated to the video conference provider 210 before the main meeting 340 is initiated. In such a case, the video conference provider 210 retrieves the stored information regarding the sub-meetings and establishes these sub-meetings 342 accordingly.

Depending on the configurations of the sub-meetings 342, the host client device 302 may further send an assignment of participants to the sub-meetings 342 to the video conference provider 210 when requesting the sub-meetings 342 to be started. For instance, the host may specify, when requesting to initiate the sub-meetings 342, the assignment through the user interface presented on the host client device 302. Alternatively, or additionally, the host may request the assignment to be automatically generated when requesting the initiation of the sub-meetings 342. In the latter case, the video conference provider 210 is further configured to generate the assignment, for example, randomly or according to an assignment algorithm In further examples, the host may have pre-assigned the participants to the sub-meetings 342 prior to the main meeting 340 starts. The host can specify the pre-assignment when scheduling the main meeting 340 or otherwise operating in the user interface for configuring the main meeting 340. The host client device 302 can communicate the pre-assignment to the video conference provider 210 before the main meeting 340 starts. The video conference provider 210 can store the pre-assignment and retrieve the stored information when starting the sub-meetings 342.

If the host client device 302 sends the assignment of participants to the sub-meetings 342 to the video conference provider 210, the video conference provider 210 admits the participants into the assigned sub-meetings 342 according to the assignment when the sub-meetings 342 are started. As a result, the participant client devices 304 associated with the participants are connected to the respective sub-meetings 342.

At block 434, the video conference provider 210 sends notifications regarding the sub-meetings 342 to the participant client devices 304. The notification to a participant further includes a list of sub-meetings 342 that the participant can join. In some examples, the same list of sub-meetings 342 (e.g., the list of all the sub-meetings 342 established for main meeting 340) is sent to all the participants. In other examples, different participants may receive different lists of sub-meetings. For example, the host may specify that some sub-meetings 342 (e.g., sub-meetings for advanced topic discussions) are open to a certain type of participants (e.g., students who have taken courses on the advanced topic). In this example, the list sent to this type of participant will include these sub-meetings while the list to other participants does not include these sub-meetings. The list of sub-meetings can include the names of the sub-meetings 342. The video conference provider 210 may further include, with authorization from the host, the information of participants of each sub-meeting 342 in the list of sub-meetings.

The video conference provider 210 can send the notification to the participant client devices 304 at an explicit request by the host client device 302. Alternatively, or additionally, the video conference provider 210 may send the notification at an implicit request by the host client device 302. For example, the request to establish the sub-meetings 342 along with the indication that the self-selection mode is enabled can be considered as an implicit request to send the notifications to the participant client devices 304 as described above. In addition, the list(s) of sub-meetings 342 sent to the participants may be sent from the host client device 302 to the video conference provider 210 or generated by video conference provider 210 based on the information provided by the host.

At block 452, the participant client device 304 receives the list of sub-meetings from which the participant can select a sub-meetings 342 to join. The participant client device 304 further presents the list of sub-meetings 342 to the participant. If the participant client device 304 has a display or other visual output device associated therewith, the participant client device 304 can present the list of sub-meetings 342 in a user interface on the display. If a participant client device 304 does not have a visual output device, such as a telephone device, the list of sub-meetings 342 may be presented through an audio output device (e.g., a speaker) by using text to speech conversion. In the latter example where the participant client device 304 is a telephone, the operations in the process 300C shown in FIGS. 4A and 4B may be performed by a telephony gateway, such as the telephony gateway server 218 shown in FIG. 2, instead of the participant client device 304 itself.

It should be noted that depending on whether the host has made an assignment of the participants to the sub-meetings 342, at block 452, the participant client device 304 may be connected to the main meeting 340 if the host has not made the assignment, or to an assigned sub-meeting 342 if the host has made the assignment.

At block 454, the participant client device 304 receives a selection, from the participant, of a sub-meeting from the list. The participant client device 304 further generates and transmits a request to join the selected sub-meeting, at block 456. At block 436, the video conference provider 210 receives the request to join the selected sub-meetings 342 from the participant client device 304 and forwards the request to the host client device 302. At block 414, the host client device 302 receives the request. At block 416, the host client device 302 approves the request for the participant to join the selected sub-meetings 342. In some scenarios, such as when the self-selection mode is enabled, the host client device 302 automatically approves the request. In other scenarios, the approval is not performed automatically. For example, and as will be discussed below in more detail, the self-selection mode may be disabled in some situations. If the host client device 302 determines that the self-selection mode is disabled, the host client device 302 does not automatically approve the request for the participant to join the selected sub-meetings 342. Instead, the host client device 302 approves the request based on factors such as whether the participant is allowed to join the requested sub-meeting after the self-selection mode is disabled.

At block 438, the video conference provider 210 admits the participant to the selected sub-meetings 342 upon receiving approval from the host client device 302. In some examples, the video conference provider 210 admits the participant to the selected sub-meeting 342 by providing the information of the real-time media server configured for handling the selected sub-meeting 342 to the participant client device 304 or by directing the participant client device 304 to the real-time media server. At block 458, the participant client device 304 disconnects from the main meeting 340 and connects to the selected sub-meeting 342 by connecting to the real-time media server. The participant client device 304 further generates and sends multimedia streams for the selected sub-meeting 342.

While in a sub-meeting 342, a participant may choose to return to the main meeting 340 or switch to another sub-meeting 342. At block 460 in FIG. 4B, the participant client device 304 receives a selection of a different sub-meeting 342 from the list of sub-meetings 342. At block 462, the participant client device 304 generates and sends the request to join the newly selected sub-meeting 342 to the video conference provider 210. Similar to the first request, the video conference provider 210 receives and forwards the request to the host client device at block 440. The host client device 302 receives the request at block 418 and approves the request at block 420 in a way similar to block 416. The video conference provider 210 further admits the participant to the newly selected sub-meeting 342 at block 442, and subsequently, the participant client device 304 disconnects from the current sub-meeting 342 and connects to the newly selected sub-meeting 342 at block 464.

It should be understood that the operations shown in the processes illustrated in FIGS. 4A and 4B are for illustration purposes only and should not be construed as limiting. More or fewer operations may be performed by the respective devices to enable the self-selection of sub-meetings described herein. For instance, the host client device 302 may be further configured to obtain the capacities of the participant client devices 304, for example, from the video conference provider 210. The capacity of a participant client device 304 describes the type of the participant client device 304 (e.g., a computer, a smart phone, or a telephone), the versions of the videoconferencing software installed on the respective participant client devices 304, and so on.

Based on the capacities of the participant client devices 304, the host client device 302 or the video conference provider 210 can identify the participant client devices 304 that do not support the self-selection mode. The identification can be performed based on, for example, that the version of the videoconferencing software is an older version that does not support self-selection. The identification may also be based on a determination that the device lacks the capability of presenting the list of sub-meetings to the participant or accepting the participant's selection of the meeting (e.g., a telephone participant client device 304 where the telephony gateway has not been configured to support self-selection of sub-meetings). If the video conference provider 210 is configured to identify the incapable participant client devices 304, the video conference provider 210 further transmits an indication of the incapable participant client devices 304 to the host client device 302. The host client device 302 can further generate and present a visual indication in the user interface shown to the host so that the host can be made aware of these devices and assign the corresponding participants to the sub-meetings 342.

In additional examples, the host client device 302 or the video conference provider 210 can further determine that each of the participants has joined a sub-meeting or elected to stay in the main meeting 340. In that case, the host client device 302 can prompt the host to disable the self-selection mode so that the sub-meetings are not disturbed by frequent joining or leaving of participants on their own. The host can disable the self-selection mode by, for example, switching to a manual assign mode or an automatic assign mode. In another example, the self-selection mode may be enabled for a certain time period (e.g., the first 5 minutes since the sub-meetings start), and be automatically disabled once the time period is over. In this example, a timer may be displayed in the user interface of each participant client device 304 so that the participants are aware of the time left to make the self-selection. Once the host disables the self-selection mode, the participants cannot self-select the sub-meetings as described above. Instead, a participant needs to return to the main meeting 340 if he/she wants to leave the current sub-meeting 342 and sends a request to the host client device 302 for the next sub-meeting to join. Such a request may or may not be approved by the host depending on the specific situation (e.g., whether the participant is allowed to join the requested sub-meeting after the self-selection mode is disabled).

Figure 5A:
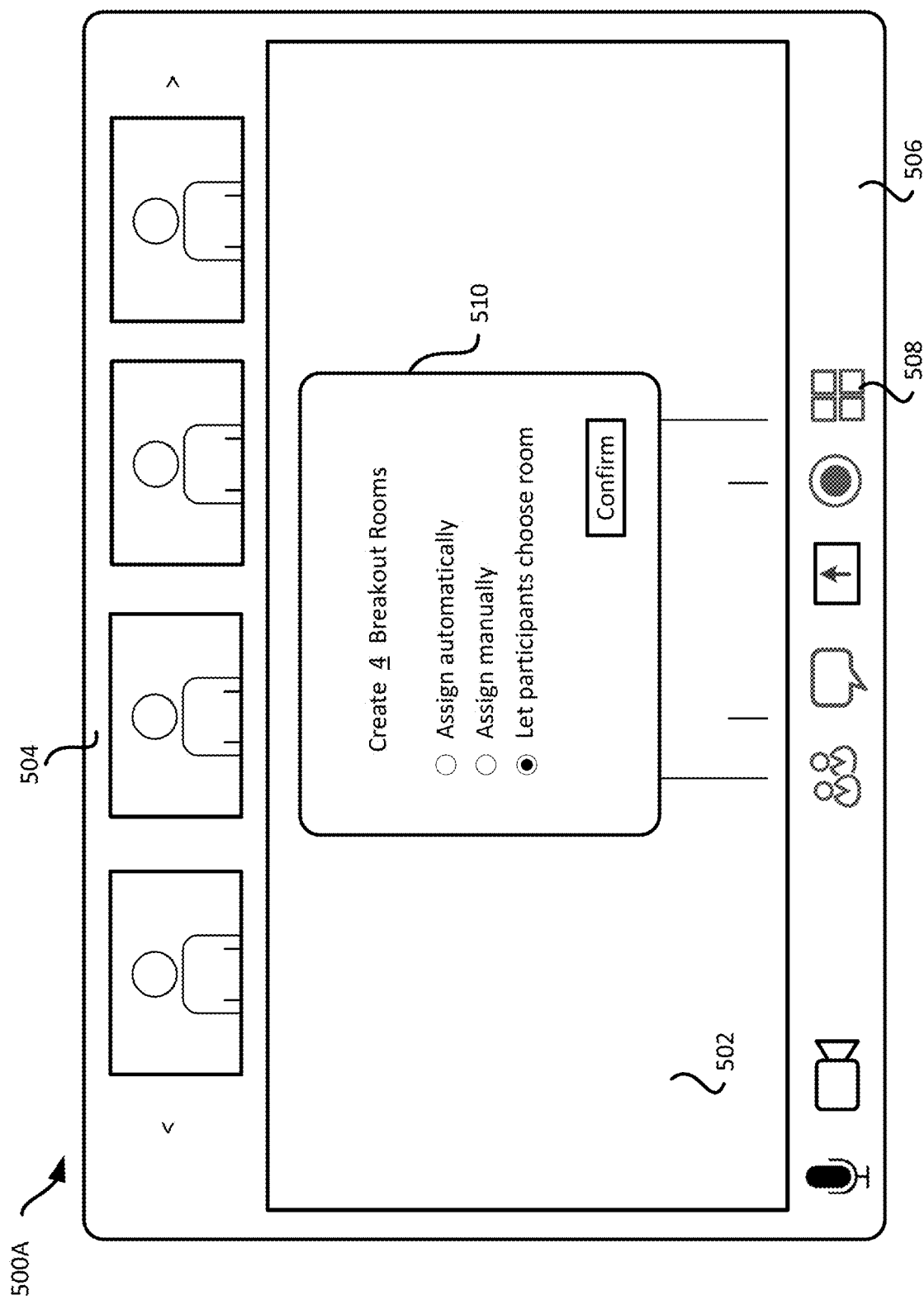
FIG. 5A shows an example of a user interface presented on a host client device for creating sub-meetings and enabling the self-selection mode, according to certain aspects described herein.

FIG. 5A shows an example of a user interface 500A presented on a host client device 302 for creating sub-meetings for a main meeting, according to certain aspects described herein. The user interface 500A includes a primary video display area 502 showing the video of the participant or host who is currently speaking and a secondary video display area 504 showing the video of the remaining participants. The user interface 500A further includes a tool area 506 showing the icons of various tools that can be invoked for the video conferencing, such as the chat tool, the tool for displaying the participant list, the tool for sharing screen, the tool for recording the meeting, and the tools for configuring the microphone and the camera of the host client device 302. The tool area 506 further includes an icon 508 of a sub-meeting tool for creating and configuring sub-meetings. Activating the sub-meeting icon 508 can bring up the window 510 in which the host can configure the sub-meetings, such as specifying the number of sub-meetings and the assignment mode of the sub-meetings. In window 510, the host can enable the self-selection mode of the sub-meetings by selecting "let participants choose room" and clicking on the "Confirm" button. After the sub-meetings 342 have been created, the host can disable the self-section mode by selecting "Assign automatically" or "Assign manually." It should be understood that the user interface shown in FIG. 5 is merely an example and should not be construed as limiting. Various other types of user interfaces can be utilized to allow the host to enable and disable the self-selection mode of the sub-meetings 342.

Figure 5B:
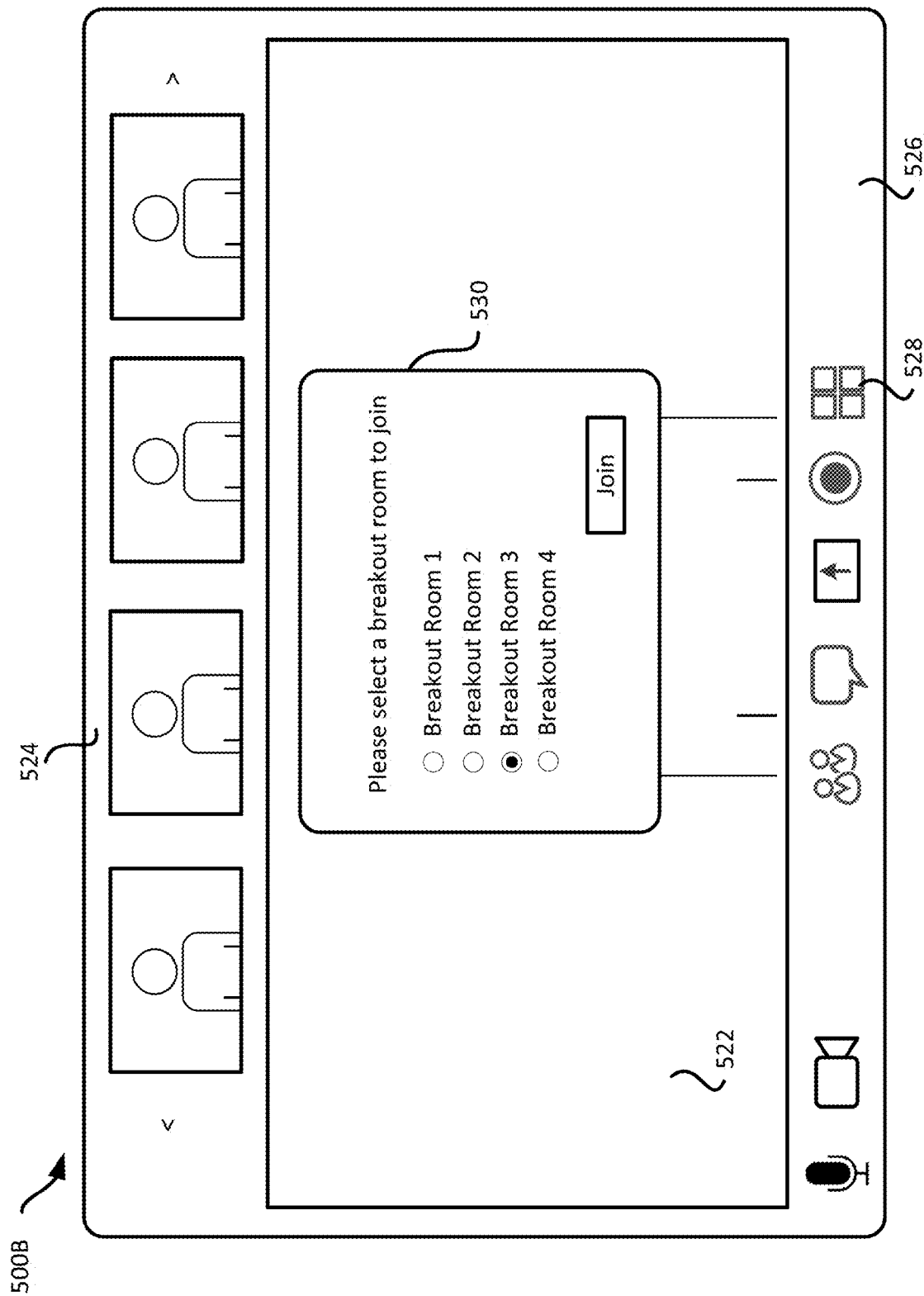
FIG. 5B shows an example of a user interface presented on a participant device for self-selecting a sub-meeting to join, according to certain aspects described herein.

FIG. 5B shows an example of a user interface 500B presented on a participant device 304 for self-selecting a sub-meeting to join, according to certain aspects described herein. Similar to the user interface 500A, the user interface 500B includes a primary video display area 522 showing the video of the participant or the host of the current meeting who is currently speaking and a secondary video display area 524 showing the video of the remaining participants of the current meeting. The current meeting may be the main meeting or a sub-meeting. The user interface 500B further includes a tool area 526 showing the icons of various tools that can be invoked for the video conferencing.

The tool area 526 includes an icon 528 for a sub-meeting tool for joining the sub-meetings and displaying the information of the sub-meetings. After the sub-meetings for the main meeting are established, the icon 528 becomes active. Activating the sub-meeting icon 528 can bring up a window 530 that shows the names of available sub-meetings that the participant can join. The list of available sub-meetings shown in window 530 is generated base on the list of sub-meetings sent by the video conference provider 210 in the notification of sub-meetings. In window 530, the participant can select the sub-meeting that he/she wants to join and confirm the selection by clicking on the "Join" button. When the self-selection mode is enabled, clicking on the "Join" button will disconnect the participant device 304 from the current meeting (main meeting or a sub-meeting) and connect the participant device 304 to the selected sub-meeting. It should be understood that the user interface shown in FIG. 5B is merely an example and should not be construed as limiting. Various other types of user interfaces can be utilized to allow a participant to view and select sub-meetings 342 to join in the self-selection mode.

Figure 6:
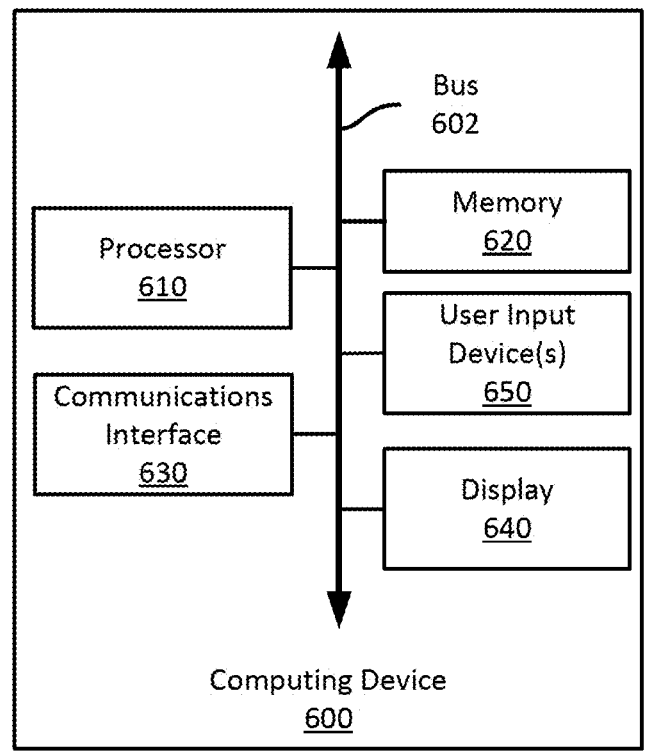
FIG. 6 shows an example computing device suitable for implementing aspects of the techniques and technologies described herein.

Referring now to FIG. 6, FIG. 6 shows an example computing device 600 suitable for implementing aspects of the techniques and technologies described herein. The example computing device 600 includes a processor 610 which is in communication with the memory 620 and other components of the computing device 600 using one or more communications buses 602. The processor 610 is configured to execute processor-executable instructions stored in the memory 620 to execute the host client device 302, the participant client device 304, the video conference provider 210, or a portion thereof according to this disclosure or to perform one or more methods for facilitating the check-in process of a visitor by a remote receptionist according to different examples, such as part or all of the example processes 400A, 400B, and 400C described above with respect to FIGS. 4A and 4B. The computing device, in this example, also includes one or more user input devices 650, such as a keyboard, mouse, touchscreen, video capture device, microphone, etc., to accept user input. The computing device 600 also includes a display 640 to provide visual output to a user.

The computing device 600 also includes a communications interface 630. In some examples, the communications interface 630 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A computer-implemented method in which one or more processing devices perform operations comprising:
    establishing, responsive to a first instruction from a host client device to start a main meeting of a video conference, the main meeting by connecting the host client device to the main meeting and processing multimedia streams to and from the host client device for the main meeting;
    joining a plurality of participants to the main meeting in response to requests from each of the participants to join the video conference;
    receiving, from the host client device, a second instruction to start a plurality of sub-meetings for the main meeting;
    establishing the plurality of sub-meetings; and
    in response to determining that a self-selection mode for the plurality of sub-meetings is enabled,
        transmitting one or more notifications to participant client devices associated with the plurality of participants, the one or more notifications identifying one or more lists of sub-meetings available to the participant client devices;
        receiving, from a participant client device, a request to connect to a particular sub-meeting of the plurality of sub-meetings;
        forwarding the request to the host client device and receiving approval of the request from the host client device;
        responsive to receiving the approval of the request from the host client device, connecting the participant client device to the particular sub-meeting and processing multimedia streams to and from the participant client device for the particular sub-meeting;
        receiving a second request from the participant client device to connect to a second sub-meeting of the plurality of sub-meetings;
        forwarding the second request to the host client device and receiving approval of the second request from the host client device; and
        disconnecting the participant client device from the particular sub-meeting and connecting the participant client device to the second sub-meeting.

2. The method of claim 1, further comprising:
    receiving a third request from the participant client device to exit the particular sub-meeting;
    forwarding the third request to the host client device and receiving approval of the third request from the host client device; and
    disconnecting the participant client device from the particular sub-meeting and connecting the participant client device to the main meeting.

3. The method of claim 1, further comprising:
    determining that the second instruction to start the plurality of sub-meetings comprises a sub-meeting assignment; and
    connecting the participant client devices to respective sub-meetings according to the sub-meeting assignment.

4. The method of claim 3, wherein the sub-meeting assignment is generated based on an assignment received via a user interface.

5. The method of claim 3, wherein the sub-meeting assignment is generated prior to establishing the main meeting.

6. The method of claim 3, wherein the sub-meeting assignment is generated automatically when the plurality of sub-meetings are established.

7. The method of claim 1, further comprising:
    determining capacities of the participant client devices;
    identifying a participant client device that does not support the self-selection mode;
    transmitting, to the host client device, an indication that the participant client device that does not support the self-selection mode;
    receiving, from the host client device, an assignment of the participant client device to one of the plurality of sub-meetings; and
    connecting the participant client device to the one sub-meeting according to the assignment.

8. A non-transitory computer-readable media communicatively coupled to one or more processors and storing processor-executable instructions that, when executed by the one or more processors, cause the one or more processors to perform operations comprising:
    establishing, responsive to a first instruction from a host client device to start a main meeting of a video conference, the main meeting by connecting the host client device to the main meeting and processing multimedia streams to and from the host client device for the main meeting;
    joining a plurality of participants to the main meeting in response to requests from each of the participants to join the video conference;
    receiving, from the host client device, a second instruction to start a plurality of sub-meetings for the main meeting;
    establishing the plurality of sub-meetings;
    in response to determining that a self-selection mode for the plurality of sub-meetings is enabled,
        transmitting one or more notifications to participant client devices associated with the plurality of participants, the one or more notifications identifying a list of sub-meetings available to the participant client devices;
        receiving, from a participant client device, a request to connect to a particular sub-meeting of the plurality of sub-meetings;

forwarding the request to connect to the particular sub-meeting to the host client device and receiving approval of the request from the host client device;

in response to receiving the approval of the request from the host client device, connecting the participant client device to the particular sub-meeting and processing multimedia streams to and from the participant client device for the particular sub-meeting;

receiving a second request from the participant client device to connect to a second sub-meeting of the plurality of sub-meetings;

forwarding the second request to the host client device and receiving approval of the second request from the host client device; and disconnecting the participant client device from the particular sub-meeting and connecting the participant client device to the second sub-meeting.

9. The non-transitory computer-readable media of claim 8, wherein the operations further comprise:

receiving a third request from the participant client device to exit the particular sub-meeting;

forwarding the third request to the host client device and receiving approval of the third request from the host client device; and disconnecting the participant client device from the particular sub-meeting and connecting the participant client device to the main meeting.

10. The non-transitory computer-readable media of claim 8, wherein the operations further comprise:

determining that the second instruction to start the plurality of sub-meetings comprises a sub-meeting assignment; and connecting the participant client devices to respective sub-meetings according to the sub-meeting assignment.

11. The non-transitory computer-readable media of claim 10, wherein the sub-meeting assignment is generated one or more of based on an assignment received via a user interface, prior to establishing the main meeting, or automatically when the plurality of sub-meetings are established.

12. The non-transitory computer-readable media of claim 8, wherein the operations further comprise:

determining capacities of the participant client devices;

identifying a participant client device that does not support the self-selection mode;

transmitting, to the host client device, an indication that the participant client device that does not support the self-selection mode;

receiving, from the host client device, an assignment of the participant client device to one of the plurality of sub-meetings; and connecting the participant client device to the one sub-meeting according to the assignment.

13. A system comprising:

a processor; and a memory device including instructions that are executable by the processor to cause the processor to perform operations comprising:

establishing, responsive to a first instruction from a host client device to start a main meeting of a video conference, the main meeting by connecting the host client device to the main meeting and processing multimedia streams to and from the host client device for the main meeting;

joining a plurality of participants to the main meeting in response to requests from each of the participants to join the video conference;

receiving, from the host client device, a second instruction to start a plurality of sub-meetings for the main meeting;

establishing the plurality of sub-meetings; and in response to determining that a self-selection mode for the plurality of sub-meetings is enabled, transmitting one or more notifications to participant client devices associated with the plurality of participants, the one or more notifications identifying one or more lists of sub-meetings available to the participant client devices;

receiving, from a participant client device, a request to connect to a particular sub-meeting of the plurality of sub-meetings;

forwarding the request to the host client device and receiving approval of the request from the host client device;

responsive to receiving the approval of the request from the host client device, connecting the participant client device to the particular sub-meeting and processing multimedia streams to and from the participant client device for the particular sub-meeting;

receiving a second request from the participant client device to connect to a second sub-meeting of the plurality of sub-meetings;

forwarding the second request to the host client device and receiving approval of the second request from the host client device; and disconnecting the participant client device from the particular sub-meeting and connecting the participant client device to the second sub-meeting.

14. The system of claim 13, wherein the operations further comprise:

receiving a third request from the participant client device to exit the particular sub-meeting;

forwarding the third request to the host client device and receiving approval of the third request from the host client device; and disconnecting the participant client device from the particular sub-meeting and connecting the participant client device to the main meeting.

15. The system of claim 13, wherein the operations further comprise:

determining that the second instruction to start the plurality of sub-meetings comprises a sub-meeting assignment; and connecting the participant client devices to respective sub-meetings according to the sub-meeting assignment.

16. The system of claim 15, wherein the sub-meeting assignment is generated based on an assignment received via a user interface.

17. The system of claim 15, wherein the sub-meeting assignment is generated prior to establishing the main meeting.

18. The system of claim 15, wherein the sub-meeting assignment is generated automatically when the plurality of sub-meetings are established.

19. The system of claim 13, wherein the operations further comprise:

determining capacities of the participant client devices;

identifying a participant client device that does not support the self-selection mode;

transmitting, to the host client device, an indication that the participant client device that does not support the self-selection mode;

receiving, from the host client device, an assignment of the participant client device to one of the plurality of sub-meetings; and connecting the participant client device to the one sub-meeting according to the assignment.

* * * * *